United States Patent
Park et al.

(12)

(10) Patent No.: US 11,387,494 B2
(45) Date of Patent: Jul. 12, 2022

(54) ELECTRODE ASSEMBLY AND SECONDARY BATTERY COMPRISING THE SAME

(71) Applicant: SAMSUNG SDI CO., LTD., Yongin-si (KR)

(72) Inventors: Jung Hyun Park, Yongin-si (KR); June Hyoung Park, Yongin-si (KR); Hyun Ki Jeong, Yongin-si (KR); Nobuyuki Oyagi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 180 days.

(21) Appl. No.: 16/275,146

(22) Filed: Feb. 13, 2019

(65) Prior Publication Data

US 2019/0252732 A1 Aug. 15, 2019

(30) Foreign Application Priority Data

Feb. 14, 2018 (KR) ........................ 10-2018-0018653

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0409* (2013.01); *H01M 10/0422* (2013.01);
(Continued)

(58) Field of Classification Search
None
See application file for complete search history.

(56) References Cited

U.S. PATENT DOCUMENTS 7,638,238 B2 12/2009 Kim et al.
8,137,832 B2 3/2012 Machida
(Continued)

FOREIGN PATENT DOCUMENTS

CN 1728441 A 2/2006
CN 101304103 A 11/2008
(Continued)

OTHER PUBLICATIONS

Extended European Search Report for corresponding European Patent Application No. 19156916.9, dated Jun. 13, 2019, 10 pages.
(Continued)

*Primary Examiner* — Haroon S. Sheikh
(74) *Attorney, Agent, or Firm* — Lewis Roca Rothgerber Christie LLP (57) ABSTRACT

An electrode assembly and a secondary battery are provided. In an exemplary embodiment, an electrode assembly includes: a first electrode plate having a first electrode tab attached thereto; a second electrode plate having at least one second electrode tab attached thereto; and a separator between the first electrode plate and the second electrode plate, the electrode assembly wound in a state in which the first electrode plate, the separator, and the second electrode plate are stacked, and the first electrode plate includes coating portions formed by coating an active material on first and second surfaces thereof, and a half-coating portion formed by coating the active material on only one of the first and second surfaces at a region corresponding to a leading edge, on the basis of a winding direction, where an active material of the second electrode plate begins.

6 Claims, 8 Drawing Sheets

(51) Int. Cl.
*H01M 10/28* (2006.01)
*H01M 50/107* (2021.01)
*H01M 50/116* (2021.01)
*H01M 50/463* (2021.01)

(52) U.S. Cl.
CPC ..... *H01M 10/0431* (2013.01); *H01M 10/286* (2013.01); *H01M 50/107* (2021.01); *H01M 50/116* (2021.01); *H01M 50/463* (2021.01)

(56) References Cited

U.S. PATENT DOCUMENTS

| | | | |
|---|---|---|---|
| 8,628,876 | B2 | 1/2014 | Kim et al. |
| 8,815,427 | B2 | 8/2014 | Machida |
| 9,048,489 | B2 | 6/2015 | Oh et al. |
| 2006/0008701 | A1 | 1/2006 | Kim et al. |
| 2006/0051678 | A1 | 3/2006 | Kim et al. |
| 2008/0280197 | A1 | 11/2008 | Machida |
| 2010/0310924 | A1 | 12/2010 | Kaneda et al. |
| 2012/0214061 | A1 | 8/2012 | Machida |
| 2014/0342205 | A1 | 11/2014 | Machida |
| 2015/0125732 | A1 | 5/2015 | Ohta et al. |
| 2015/0140381 | A1 | 5/2015 | Kim et al. |
| 2017/0288275 | A1* | 10/2017 | Yokoshima ....... H01M 10/0587 |
| 2019/0089005 | A1 | 3/2019 | Guo et al. |
| 2020/0280071 | A1* | 9/2020 | Yoshii ............... H01M 10/4235 |

FOREIGN PATENT DOCUMENTS

| | | |
|---|---|---|
| CN | 102037584 A | 4/2011 |
| EP | 2 858 145 A1 | 4/2015 |
| JP | 2010055906 A | 3/2010 |
| KR | 20060000100 A | 1/2006 |
| KR | 10-1009517 B | 1/2011 |
| KR | 10-1182904 B | 9/2012 |
| KR | 10-2014-0132134 A | 11/2014 |
| KR | 10-1553551 B | 9/2015 |
| WO | WO 2009/141958 A1 | 11/2009 |
| WO | WO 2017/219345 A1 | 12/2017 |

OTHER PUBLICATIONS

Chinese First Office action dated Dec. 16, 2021 issued in corresponding CN Application No. 201910114030.8, 8 pages, with English translation, 9 pages.

* cited by examiner

ELECTRODE ASSEMBLY AND SECONDARY BATTERY COMPRISING THE SAME

CROSS-REFERENCE TO RELATED APPLICATION

This application claims priority to and the benefit of Korean Patent Application No. 10-2018-0018653, filed on Feb. 14, 2018 in the Korean Intellectual Property Office, the entire content of which is herein incorporated by reference.

BACKGROUND

1. Field

Aspects of embodiments of the present invention relate to an electrode assembly and a secondary battery comprising the same.

2. Description of the Related Art

In general, a secondary battery is manufactured by accommodating an electrode assembly including a positive electrode plate, a negative electrode plate, and a separator interposed therebetween in a case with an electrolyte. Unlike a primary battery that is not rechargeable, the secondary battery can be charged and discharged. With technological advances in mobile devices, such as cellular phones and notebook computers, and increased production yields, demand for secondary batteries has rapidly increased. Recently, research and development in secondary batteries has been actively conducted for use as alternative energy sources to replace fossil fuels as energy sources for electric vehicles or hybrid vehicles.

Currently commercially available secondary batteries include a nickel-cadmium (Ni—Cd) battery, a nickel-hydrogen (Ni—MH) battery, a nickel-zinc (Ni—Zn) battery, a lithium secondary battery, and so on. Specifically, the lithium secondary battery generates little memory effect, compared to a nickel-based secondary battery, making the lithium secondary battery capable of being freely charged and discharged, and has several advantages including a low self-discharge rate and a high-energy density. Accordingly, the lithium secondary battery is drawing increasing attention.

The lithium secondary battery may undergo excessively active reactions between a positive electrode active material and an electrolyte constituting the lithium secondary battery due to overcharging to a certain level of voltage or higher, resulting in a structural collapse of the positive electrode active material, an oxidation of the electrolyte, or precipitation of lithium in a negative electrode active material. If such a state is continued, the lithium secondary battery may ignite or explode.

SUMMARY

According to an aspect of embodiments of the present invention, an electrode assembly can be prevented or substantially prevented from being deformed, and a secondary battery comprising the same is provided.

The above and other aspects of the present invention will be described in or be apparent from the following description of some exemplary embodiments.

According to one or more embodiments of the present invention, an electrode assembly includes: a first electrode plate having a first electrode tab attached thereto; a second electrode plate having at least one second electrode tab attached thereto; and a separator between the first electrode plate and the second electrode plate, the electrode assembly wound in a state in which the first electrode plate, the separator, and the second electrode plate are stacked, wherein the first electrode plate comprises coating portions formed by coating an active material on first and second surfaces thereof, and a half-coating portion formed by coating the active material on only one of the first and second surfaces at a region corresponding to a leading edge, on the basis of a winding direction, where an active material of the second electrode plate begins.

The first electrode tab may be positioned at a central region of the first electrode plate, and the half-coating portion may be formed ahead of the first electrode tab on the basis of the winding direction.

The first electrode plate may further comprise another half-coating portion formed by coating the active material of the first electrode plate on only one of the first and second surfaces at a region corresponding to a trailing edge, on the basis of the winding direction, where the active material of the second electrode plate ends.

The electrode assembly may further include a cover tape on the half-coating portion.

The cover tape may be attached to exposed regions of the first electrode plate, which are exposed through internal holes formed in the cover tape.

According to one or more embodiments of the present invention, an electrode assembly includes: a first electrode plate having a first electrode tab attached thereto; a second electrode plate having at least one second electrode tab attached thereto; and a separator between the first electrode plate and the second electrode plate, the electrode assembly wound in a state in which the first electrode plate, the separator, and the second electrode plate are stacked, wherein the second electrode plate includes coating portions formed by coating an active material on first and second surfaces thereof, and a cover tape on a leading edge, based on a winding direction, where the active material of the second electrode plate begins.

The cover tape may include polyethylene (PE) or polypropylene (PP).

The second electrode plate may further include a half-coating portion formed by coating the active material on only one of the first and second surfaces at a region corresponding to the leading edge, on the basis of the winding direction.

The cover tape may cover the half-coating portion.

According to still another aspect of embodiments of the present invention, a secondary battery including the electrode assembly is provided.

As described above, in an electrode assembly according to one or more embodiments of the present invention and a secondary battery including the electrode assembly, half-coating portions are formed on active material start regions of the negative electrode plate, corresponding to leading and trailing edges of the positive electrode plate, such that an active material is not coated on a portion of the second surface of the positive electrode plate, facing the negative electrode plate, and a cover tape is further formed on the half-coating portions, thereby reducing the thickness of the leading edge of the positive electrode plate and forming an unreacted region. Accordingly, it is possible to suppress the electrode assembly from being internally deformed.

In addition, in an electrode assembly according to one or more embodiments of the present invention and a secondary battery including the electrode assembly, a cover tape is formed on a leading edge of the negative electrode plate, thereby forming an unreacted region. Therefore, the thickness of the leading edge of the negative electrode plate can be reduced, thereby suppressing internal deformation of the electrode assembly.

DESCRIPTION OF REFERENCE NUMERALS

| 100: Secondary battery | 110: Case |
|---|---|
| 120, 220, 320, 420: Electrode assembly | 130: Cap assembly |

DETAILED DESCRIPTION

Herein, some exemplary embodiments of the present invention will be described in further detail with reference to the accompanying drawings.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element is referred to as being "connected to" another element, the element may be directly connected to the another element or one or more intervening elements may be present therebetween.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
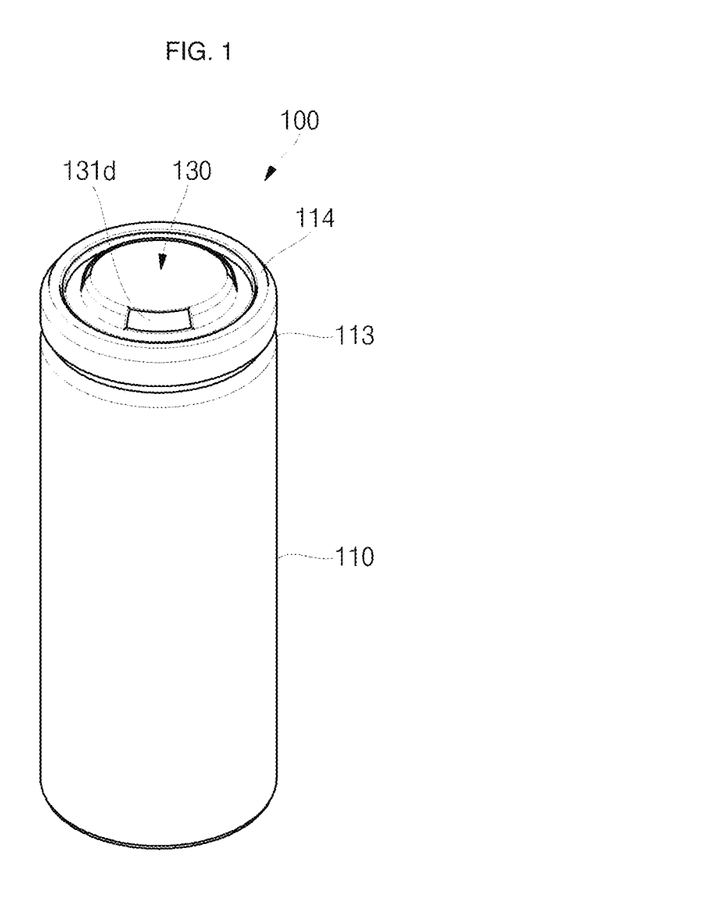
FIG. 1 is a perspective view of a secondary battery according to an embodiment of the present invention.
Figure 2:
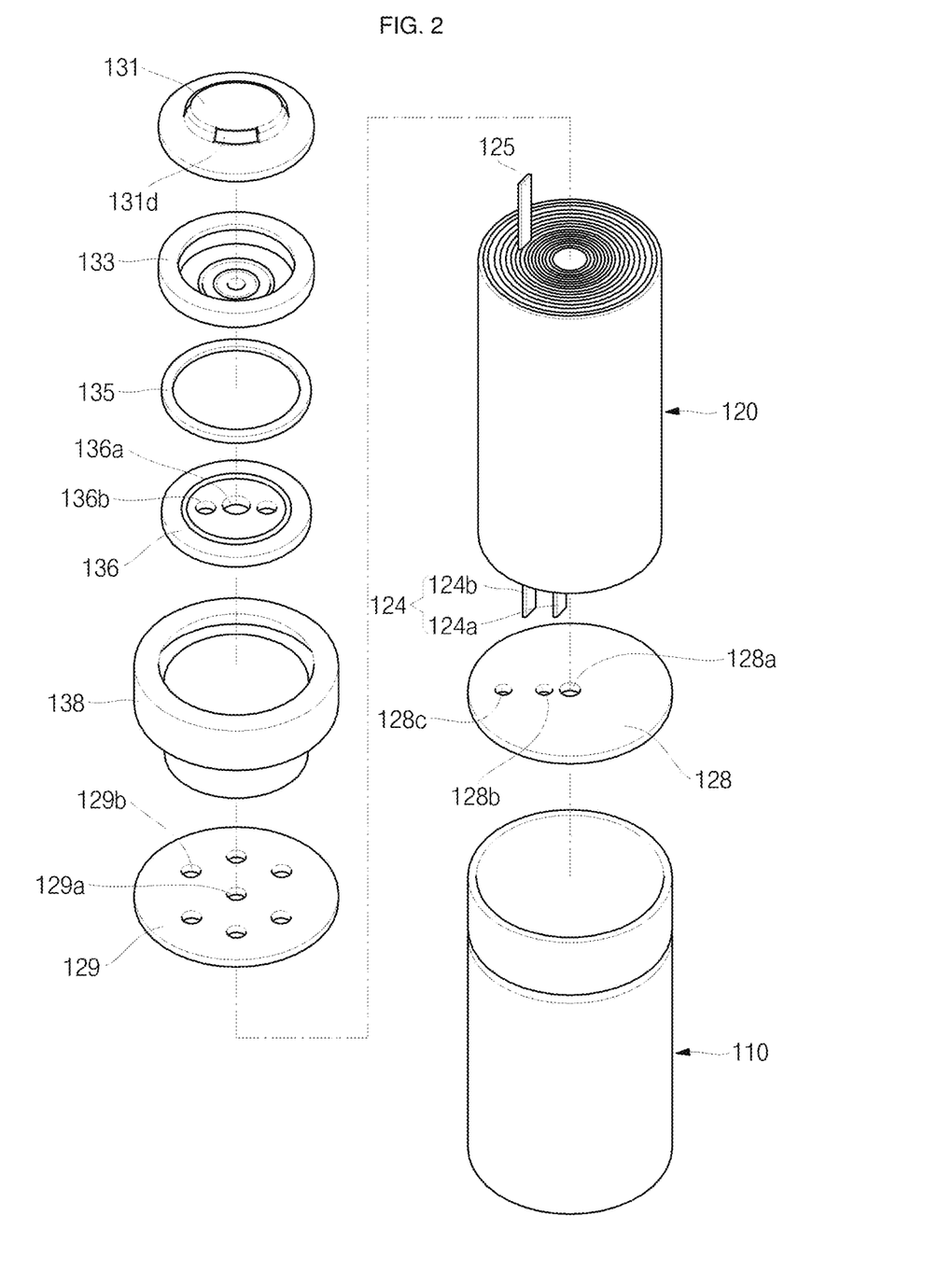
FIG. 2 is an exploded perspective view of a secondary battery according to an embodiment of the present invention.
Figure 3:
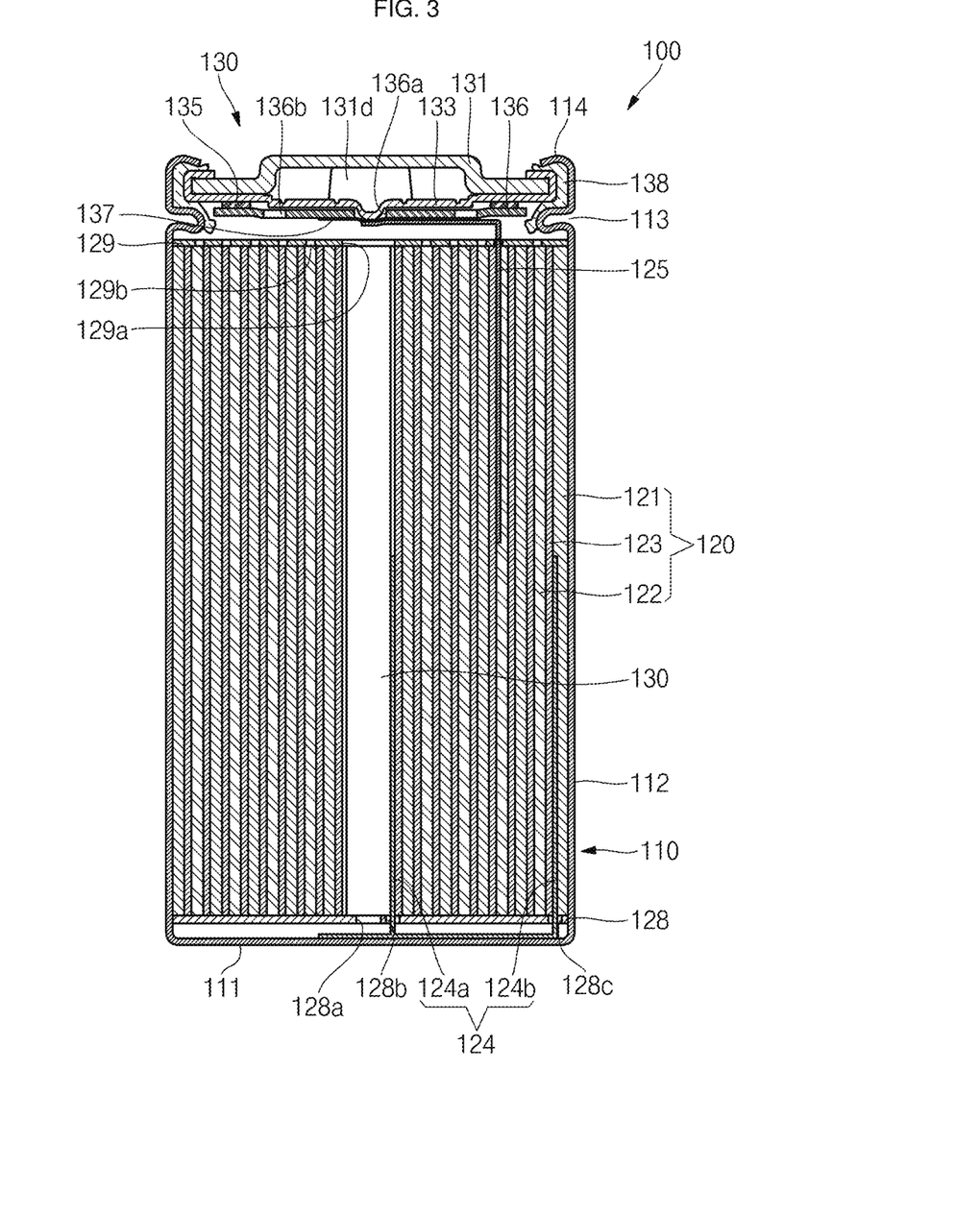
FIG. 3 is a longitudinal cross-sectional view of a secondary battery according to an embodiment of the present invention.
Figure 4:
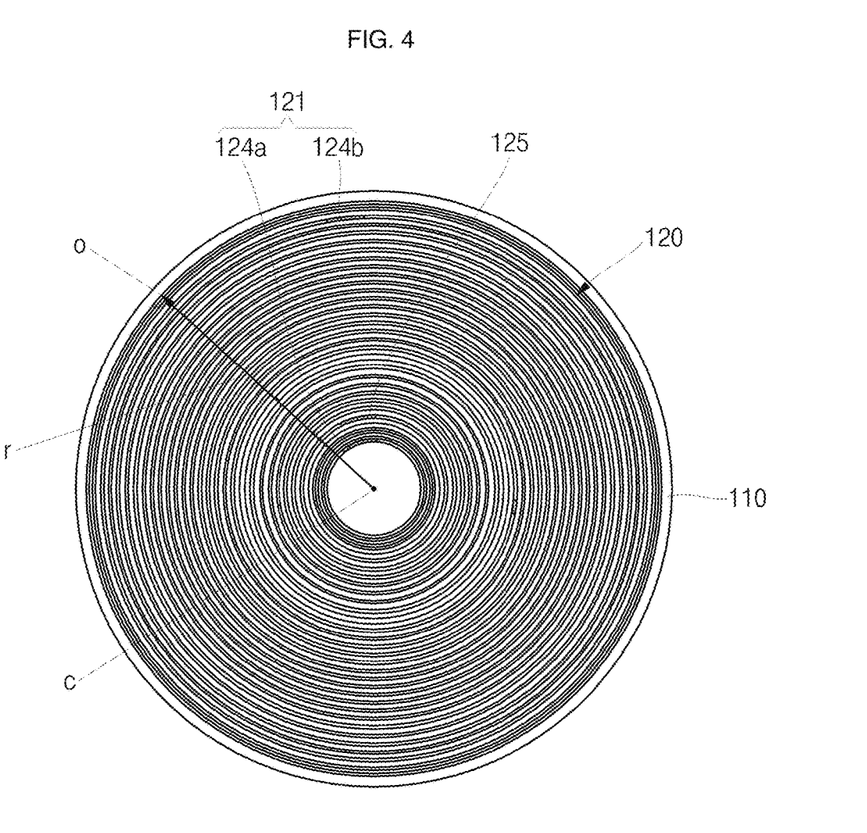
FIG. 4 is a transverse cross-sectional view of a secondary battery according to an embodiment of the present invention.

FIG. 1 is a perspective view of a secondary battery according to an embodiment of the present invention; FIG. 2 is an exploded perspective view of a secondary battery according to an embodiment of the present invention; FIG. 3 is a longitudinal cross-sectional view of a secondary battery according to an embodiment of the present invention; and FIG. 4 is a transverse cross-sectional view of a secondary battery according to an embodiment of the present invention.

As illustrated in FIGS. 1 to 4, a secondary battery 100 according to an embodiment of the present invention includes a case 110, an electrode assembly 120 accommodated in the case 110, and a cap assembly 130 sealing a top opening of the case 110.

In an embodiment, the case 110 includes a circular bottom portion 111 and side portions 112 upwardly extending by a length (e.g., a predetermined length) from the bottom portion 111. Here, the secondary battery 100 is illustrated as a cylindrical secondary battery, but the present invention is not limited thereto. For example, a prismatic or pouch-type secondary battery may also be applied to the present invention. During the manufacture of the secondary battery 100, a top portion of the case 110 is in an opened state. Therefore, the electrode assembly 120 may be inserted into the case 110 together with an electrolyte solution for assembling the secondary battery 100. The case 110 may be made of steel, a steel alloy, aluminum, an aluminum alloy, or equivalents thereof, but the present invention is not limited thereto. In an embodiment, in order to prevent or substantially prevent the electrode assembly 120 from being deviated to the outside, an inwardly recessed beading part 113 may be formed at a bottom portion of the cap assembly 130 and an inwardly bent crimping part 114 may be formed at a top portion of the cap assembly 130.

The electrode assembly 120 is accommodated within the case 110 together with the electrolyte solution. Here, the electrolyte solution is an organic solution containing salt injected to allow lithium ions to move between a positive electrode and a negative electrode of the electrode assembly 120. The electrolyte solution may include a nonaqueous organic electrolyte solution, which is a mixture of a lithium salt, such as $LiPF_6$, $LiBF_4$ or $LiClO_4$, and a high-purity organic solvent, but is not limited thereto.

The electrode assembly 120 includes a negative electrode plate 121 coated with a negative electrode active material, a positive electrode plate 122 coated with a positive electrode active material, and a separator 123 interposed between the negative electrode plate 121 and the positive electrode plate 122 and allowing only lithium ions to move between the negative electrode plate 121 and the positive electrode plate 122 while preventing or substantially preventing electrical shorts from occurring between the negative electrode plate 121 and the positive electrode plate 122. The negative electrode plate 121, the positive electrode plate 122, and the separator 123 are wound in a substantially cylindrical configuration. In addition, a negative electrode tab 124 downwardly protruding by a length (e.g., a predetermined length) and extending may be attached to the negative electrode plate 121, and a positive electrode tab 125 upwardly protruding by a length (e.g., a predetermined length) and extending may be attached to the positive electrode plate 122, or vice versa.

Figure 5:
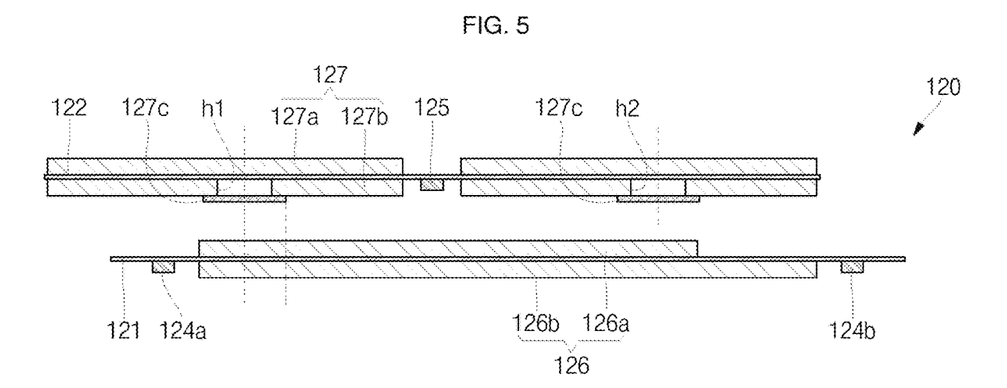
FIG. 5 is a cross-sectional view of an electrode assembly before being wound in a secondary battery, according to an embodiment of the present invention.
Figure 6:
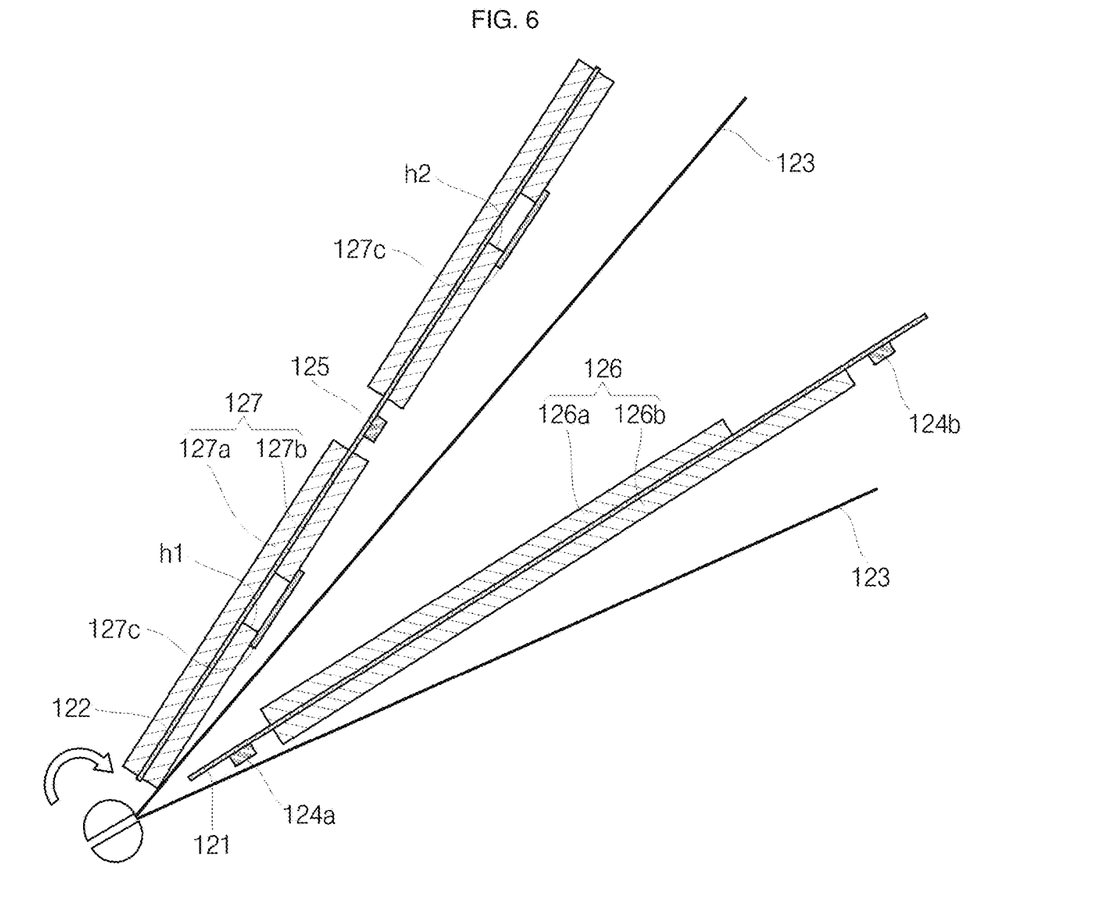
FIG. 6 is a cross-sectional view illustrating a process of winding an electrode assembly around a mandrel in a secondary battery, according to an embodiment of the present invention.

Additionally, a cross-sectional view of an electrode assembly before being wound in a secondary battery, according to an embodiment of the present invention, is illustrated in FIG. 5; and a cross-sectional view illustrating a process of winding an electrode assembly around a mandrel in a secondary battery, according to an embodiment of the present invention, is illustrated in FIG. 6. Herein, configurations of an electrode assembly and a secondary battery according to an embodiment of the present invention will be described in further detail with reference to FIGS. 5 and 6.

In an embodiment, the negative electrode plate 121 of the electrode assembly 120 is formed of a plate-shaped metal foil made of copper (Cu) or nickel (Ni) and includes a negative electrode coating portion 126 formed by coating an active material including a transition metal oxide on both surfaces of the negative electrode plate 121. Here, the negative electrode coating portion 126 may include a first negative electrode coating portion 126a formed on a first surface of the negative electrode plate 121 and a second negative electrode coating portion 126b formed on a second surface of the negative electrode plate 121 opposite to the first surface.

In addition, the negative electrode plate 121 may be wound around a mandrel together with the positive electrode plate 122 and the separator 123, and winding may be started from the left in the drawing, where the mandrel is positioned. In addition, at a leading edge of the negative electrode plate 121 on the basis of a winding direction, an active material may not be coated on the first and second surfaces of the negative electrode plate 121. That is, since no active material exists at the leading edge of the negative electrode plate 121, the leading edge of the negative electrode plate 121 does not react with the active material of the positive electrode plate 122. Accordingly, the leading edge may generate an unreacted region inside the electrode assembly 120 after winding. Therefore, it is possible to suppress internal deformation of the electrode assembly 120. In addition, in the negative electrode plate 121, a portion of the first negative electrode coating portion 126a may be removed from or not present on the first surface at a trailing edge on the basis of the winding direction. Therefore, an unreacted region is also generated at the trailing edge of the negative electrode plate 121 outside the electrode assembly 120 after winding, thereby suppressing deformation of the electrode assembly 120.

In an embodiment, negative electrode tabs 124a and 124b are attached to the second surface of the negative electrode plate 121. The negative electrode tabs 124a and 124b may be partially welded and attached to the negative electrode plate 121 and may downwardly protrude by a length (e.g., a predetermined length) in a lengthwise direction of the electrode assembly 120. In an embodiment, the negative electrode tabs 124a and 124b may include a plurality of negative electrode tabs, including a first negative electrode tab 124a positioned at the leading edge of the negative electrode plate 121 and a second negative electrode tab 124b positioned at the trailing edge of the negative electrode plate 121, on the basis of the winding direction. In further detail, since the active material is not coated on the leading and trailing edges of the negative electrode plate 121, non-coating portions, through which the negative electrode plate 121 is exposed, may be provided in the negative electrode plate 121. The first negative electrode tab 124a and the second negative electrode tab 124b are coupled to the respective non-coating portions to then be electrically connected to the negative electrode plate 121.

In an embodiment, on a cross-sectional plane of the electrode assembly 120, the negative electrode tabs 124a and 124b may be positioned in parallel along a cross-sectional radius "r" corresponding to a length ranging from a winding center "c" to an outermost portion "o." In an exemplary embodiment, the first negative electrode tab 124a may be positioned roughly at a center of the cross-sectional radius "r," and the second negative electrode tab 124b may be positioned roughly at an outer portion of the cross-sectional radius "r." In an embodiment, the first and second negative electrode tabs 124a and 124b are positioned on a same line along the cross-sectional radius "r," such that they can be easily coupled to a bottom surface of the case 110 in a subsequent process. The negative electrode tabs 124a and 124b may be made of copper or nickel, but the present invention is not limited thereto.

In an embodiment, the positive electrode plate 122 is formed of a plate-shaped metal foil made of aluminum (Al) and includes a positive electrode coating portion 127 formed by coating an active material including a transition metal oxide on both surfaces of the positive electrode plate 122. Here, the positive electrode coating portion 127 may include a first positive electrode coating portion 127a formed on a first surface of the positive electrode plate 122, and a second positive electrode coating portion 127b formed on a second surface of the positive electrode plate 122 opposite to the first surface.

The positive electrode tab 125 is attached to the second surface of the positive electrode plate 122. The positive electrode tab 125 may be partially welded and attached to the positive electrode plate 122 and may downwardly protrude by a length (e.g., a predetermined length) in the lengthwise direction of the electrode assembly 120. In an embodiment, on the cross-sectional plane of the wound electrode assembly 120, the positive electrode tab 125 may be positioned between the first negative electrode tab 124a and the second negative electrode tab 124b along the cross-sectional radius "r" corresponding to the length ranging from the winding center "c" to the outermost portion "o."

In an embodiment, the positive electrode tab 125 and the negative electrode tab 124 may be positioned on surfaces in the same direction in the wound electrode assembly 120 including the positive electrode plate 122 and the negative electrode plate 121. Alternatively, the positive electrode tab 125 and the negative electrode tab 124 may be positioned on opposite surfaces of the positive electrode plate 122 and the negative electrode plate 121. Here, the surfaces in the same direction refers to surfaces of the positive electrode plate 122 and the negative electrode plate 121 in the wound electrode assembly 120, which both face either the outermost portion "o" or the winding center "c." In addition, the opposite surfaces of the positive electrode plate 122 and the negative electrode plate 121 means that the negative electrode tab 124 is formed on a surface facing the winding center "c" in a case in which the positive electrode tab 125 is formed on a surface facing the outermost portion "o" in the wound electrode assembly 120, or vice versa. That is, the present invention does not limit the meaning of the opposite surfaces of the positive electrode plate 122 and the negative electrode plate 121, which are formed in a foil type, to surfaces to which the positive electrode tab 125 and the negative electrode tab 124 are attached.

In an embodiment, the positive electrode tab 125 and the negative electrode tab 124 may be aligned on a same line in a lengthwise direction in the wound electrode assembly 120. In addition, the positive electrode tab 125 and the negative electrode tab 124 may be positioned so as not to overlap each other in the lengthwise direction in the wound electrode assembly 120. That is, the positive electrode tab 125 and the negative electrode tab 124 may be positioned on the same line in the lengthwise direction of the electrode assembly 120 such that a bottom portion of the positive electrode tab 125 and a top portion of the negative electrode tab 124 do not overlap each other. Accordingly, a degree of roundness in winding the electrode assembly 120 may be prevented or substantially prevented from being lowered. The degree of roundness may be lowered in winding the electrode assembly 120 when the positive electrode tab 125 and the negative electrode tab 124, which are thicker than the positive electrode plate 122 and the negative electrode plate 121, overlap each other in the lengthwise direction of the electrode assembly 120. Accordingly, in order to prevent or substantially prevent the degree of roundness from being lowered, the positive electrode tab 125 and the negative electrode tab 124 may be positioned so as not to overlap with each other. The positive electrode tab 125 may be made of aluminum, but the present invention is not limited thereto.

In an embodiment, the positive electrode plate 122 may include a half-coating portion h1 formed at a region corresponding to the leading edge of the negative electrode plate 121, where the negative electrode coating portion 126 is started, such that the active material is coated on the first surface but is not coated on the second surface facing the negative electrode plate 121. The half-coating portion h1 may make the leading edge of the negative electrode coating portion 126a formed on the first surface of the negative electrode plate 121 not react with the positive electrode plate 122, thereby preventing or substantially preventing a reaction from taking place at the leading edge, that is, at an inside region of the electrode assembly 120 after winding. Therefore, it is possible to suppress the wound electrode assembly 120 from being internally deformed. In addition, since the half-coating portion h1 further performs a function of reducing a thickness of the leading edge of the positive electrode plate 122, deformation of the wound electrode assembly 120 can be further suppressed. In addition, since the half-coating portion h1 produces a space (e.g., a predetermined space) in the electrode assembly 120, a slight deformation occurring at the inside region of the electrode assembly 120 can be tolerated, thereby suppressing the electrode assembly 120 from being internally deformed.

In an embodiment, the positive electrode plate 122 may include another half-coating portion h2 formed at a region corresponding to the trailing edge of the negative electrode plate 121, where the negative electrode coating portion 126 is finished, like the region corresponding to the leading edge, such that the active material is not coated on the second surface of the positive electrode plate 122. Since the half-coating portion h2 also suppresses a reaction with the active material of the negative electrode plate 121 and reduces the thickness of the positive electrode plate 122, it is also possible to prevent or substantially prevent the electrode assembly 120 from being deformed in the same manner as the half-coating portion h1.

In an embodiment, a cover tape 127c may further be formed at the half-coating portions h1 and h2, respectively. The cover tape 127c may prevent or substantially prevent the active material from rising at regions corresponding to the half-coating portions h1 and h2. The cover tape 127c may be made of a general insulating material, such as PET or PP, but is not limited thereto.

In an embodiment, a first insulation plate 128 may be interposed between the electrode assembly 120 and the bottom portion 111 of the case 110, the first insulation plate 128 coupled to the case 110 and including a first hole 128a formed at its center and second and third holes 128b and 128c formed at its outer sides. The first insulation plate 128 may prevent the electrode assembly 120 from electrically contacting the bottom portion 111 of the case 110. Specifically, the first insulation plate 128 may prevent the positive electrode plate 122 of the electrode assembly 120 from electrically contacting the bottom portion 111 of the case 110. The first hole 128a may allow a large amount of gas generated due to abnormality of the secondary battery 100 to rapidly move upwards, and the second and third holes 128b and 128c, through which the negative electrode tab 124 passes, may allow the negative electrode tab 124 to be welded to the bottom portion 111 of the case 110. Additionally, the electrode assembly 120 may further include a center pin (not shown) shaped of a hollow pipe, thereby allowing the large amount of gas generated due to abnormality of the secondary battery to be easily exhausted through an internal passageway of the center pin.

In an embodiment, a second insulation plate 129 may be interposed between the electrode assembly 120 and the cap assembly 130, the second insulation plate 129 coupled to the case 110 and including a first hole 129a formed at its center and a plurality of second holes 129b formed at its outer sides. The second insulation plate 129 may prevent the electrode assembly 120 from electrically contacting the cap assembly 130. Specifically, the second insulation plate 129 may prevent the negative electrode plate 121 of the electrode assembly 120 from electrically contacting the cap assembly 130. The first hole 129a may allow a large amount of gas generated due to abnormality of the secondary battery to rapidly move toward the cap assembly 130, and some of the plurality of second holes 129b, through which the positive electrode tab 125 may pass, may allow the positive electrode tab 125 to be welded to the cap assembly 130. Additionally, the second holes 129b may allow an electrolyte solution to rapidly flow into the electrode assembly 120 while injecting the electrolyte solution. The electrolyte solution may function as a movement medium of lithium ions generated by an electrochemical reaction taking place at the positive and negative electrode plates of the secondary battery 100 during charging and discharging.

In an embodiment, the cap assembly 130 includes a cap-up 131 including a plurality of through holes 131d formed therein, a safety plate 133 installed under the cap-up 131, a connection ring 135 installed under the safety plate 133, a cap-down 136 coupled to the connection ring 135 and including first and second through holes 136a and 136b formed therein, a sub-plate 137 fixed to a bottom portion of the cap-down 136 and electrically connected to the positive electrode tab 125, and an insulation gasket 138 insulating the cap-up 131, the safety plate 133, the connection ring 135, and the cap-down 136 from the side portions 112 of the case 110.

In an embodiment, the insulation gasket 138 is compressed between the beading part 113 formed at a substantially side portion of the case 110 and the crimping part 114. In addition, the through-holes 131d formed in the cap-up 131 and the through-hole 136b formed in the cap-down 136 may function to exhaust internal gases to the outside when an abnormal internal voltage is generated in the case 110. The safety plate 133 is first upwardly inverted by the internal voltage to be electrically disconnected from the sub-plate 137 and is then ruptured to release the internal gas to the outside.

Herein, effects of an electrode assembly according to an embodiment of the present invention and a secondary battery including the electrode assembly will be described in further detail.

Figure 7A:
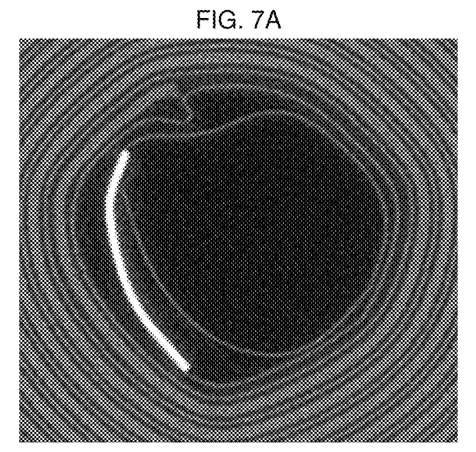
FIGS. 7A and 7B are cross-sectional views of electrode assemblies in a conventional secondary battery and a secondary battery according to an embodiment of the present invention, respectively.
Figure 7B:
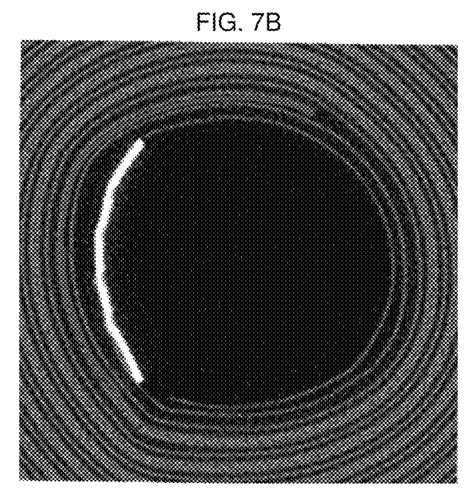

FIGS. 7A and 7B are cross-sectional views of electrode assemblies in a conventional secondary battery and a secondary battery according to an embodiment of the present invention, respectively.

Referring first to FIG. 7A, it is illustrated in a conventional cylindrical secondary battery that deformation, e.g., bending of electrode plates, has occurred at the inside region of an electrode assembly, which is generally caused by an increase in the number of electrode tabs for reducing resistance or an increase in the amount of silicon (Si) for increasing an energy density.

Next, referring to FIG. 7B, it is illustrated in the secondary battery 100 including the electrode assembly 120 according to an embodiment of the present invention that with the aforementioned configurations of the negative electrode plate 121 and the positive electrode plate 122, internal deformation has not occurred to the electrode assembly 120.

As described above, in the electrode assembly 120 according to an embodiment of the present invention and the secondary battery 100 including the same, the half-coating portions h1 and h2 are formed at the regions of the positive electrode plate 122, corresponding to the leading and trailing edges of the negative electrode plate 121, where the negative electrode coating portion 126 is started (begins) and finished (ends), respectively, such that the active material is not coated on a portion of the second surface facing the negative electrode plate 121, and the cover tape 127c is further formed on the respective half-coating portions h1 and h2, thereby reducing the thickness of a leading edge of the positive electrode plate 122 and producing an unreacted region in the positive electrode plate 122. Accordingly, it is possible to suppress internal deformation of the electrode assembly 120.

Herein, a configuration of an electrode assembly for a secondary battery according to another embodiment of the present invention will be described.

Figure 8:
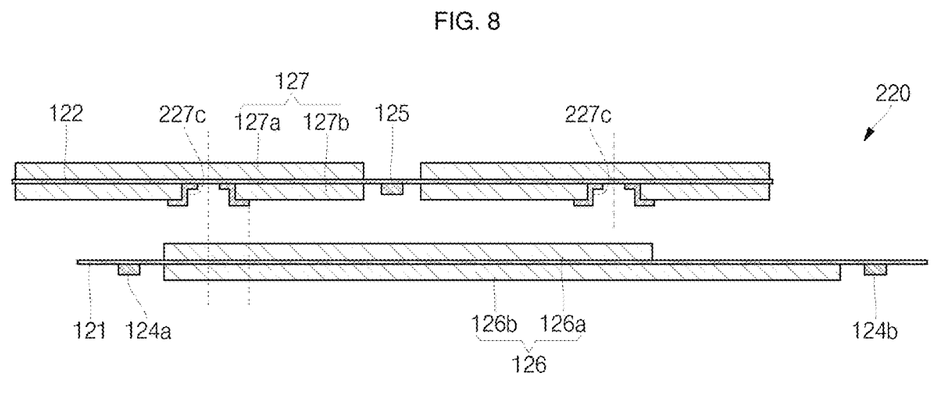
FIG. 8 is a cross-sectional view of an electrode assembly before being wound in a secondary battery, according to another embodiment of the present invention.

FIG. 8 is a cross-sectional view of an electrode assembly before being wound in a secondary battery, according to another embodiment of the present invention.

Referring to FIG. 8, an electrode assembly 220 for a secondary battery according to another embodiment of the present invention may include a negative electrode plate 121 and a positive electrode plate 122.

In an embodiment, the negative electrode plate 121, a negative electrode coating portion 126 formed on the negative electrode plate 121, and negative electrode tabs 124a and 124b may have substantially the same configurations and corresponding functional components of the previous embodiment, and further detailed descriptions thereof will not be given.

Like in the previously described embodiment, first and second positive electrode coating portions 127a and 127b are formed on first and second surfaces of the positive electrode plate 122, respectively. However, cover tapes 227c including internal holes formed therein may be coupled to half-coating portions formed on the second surface of the positive electrode plate 122 to then be brought into close contact with exposed portions of the positive electrode plate 122. Accordingly, the cover tape 227c can be brought into close contact with the positive electrode plate 122 without creating a separate space, thereby minimizing or reducing a thickness change in a structure including the positive electrode plate 122. In one embodiment, the cover tape 227c may first be coupled to each of the half-coating portions as a single body, followed by cutting to provide a centrally formed hole. Accordingly, the cover tape 227c may be adhered to the positive electrode plate 122 in such a manner as shown FIG. 8.

Herein, a configuration of an electrode assembly for a secondary battery according to another embodiment of the present invention will be described.

Figure 9:
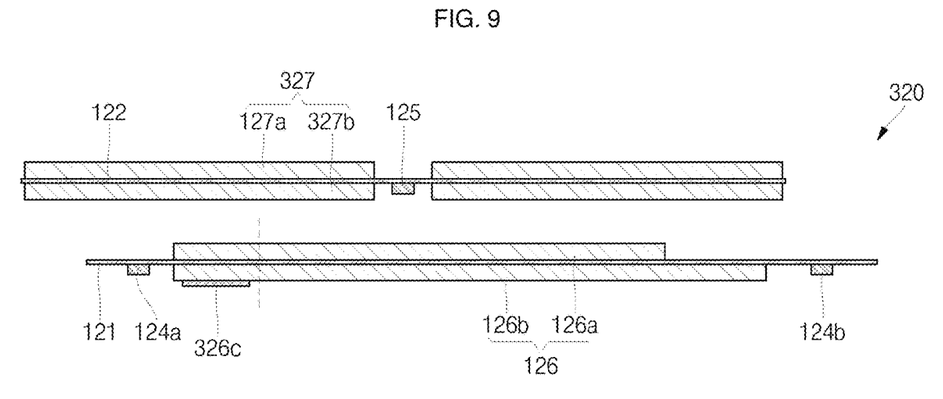
FIG. 9 is a cross-sectional view of an electrode assembly before being wound in a secondary battery, according to another embodiment of the present invention.

FIG. 9 is a cross-sectional view of an electrode assembly before being wound in a secondary battery, according to another embodiment of the present invention.

Referring to FIG. 9, an electrode assembly 320 for a secondary battery according to another embodiment of the present invention may include a negative electrode plate 121 and a positive electrode plate 122.

In an embodiment, the negative electrode plate 121, a negative electrode coating portion 126 formed in the negative electrode plate 121, and negative electrode tabs 124a and 124b may have substantially the same configurations and corresponding functional components of the previously described embodiment. However, a cover tape 326c may further be formed at a leading edge of a second surface of the negative electrode plate 121, where a second negative electrode coating portion 126b is started.

In an embodiment, the cover tape 326c is positioned at the innermost portion of the electrode assembly 320 after winding, to then fix an inside region of the electrode assembly 320, thereby suppressing internal deformation of the electrode assembly 320. Like in the previously described embodiment, the cover tape 326c may also be made of a general insulating material, such as PP or PET, but is not limited thereto.

Like in the previous embodiment, a first positive electrode coating portion 127a is formed on a first surface of the positive electrode plate 122. However, a second positive electrode coating portion 327b may be formed on a second surface of the positive electrode plate 122 so as to correspond to the first positive electrode coating portion 127a. The second positive electrode coating portion 327b may also be formed on a region excluding a non-coating portion for forming a positive electrode tab 125. Accordingly, a separate half-coating portion may not be formed on the positive electrode plate 122.

Herein, a configuration of an electrode assembly for a secondary battery according to another embodiment of the present invention will be described.

Figure 10:
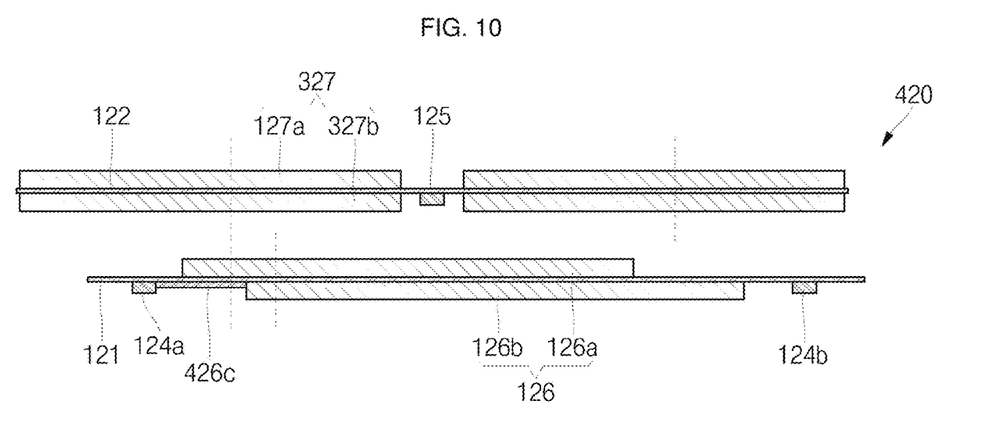
FIG. 10 is a cross-sectional view of an electrode assembly before being wound in a secondary battery, according to another embodiment of the present invention.

FIG. 10 is a cross-sectional view of an electrode assembly before being wound in a secondary battery, according to another embodiment of the present invention.

Referring to FIG. 10, an electrode assembly 420 according to another embodiment of the present invention may include a negative electrode plate 121 and a positive electrode plate 122.

In an embodiment, the negative electrode plate 121, a negative electrode coating portion 126 formed in the negative electrode plate 121, and negative electrode tabs 124a and 124b may have substantially the same configurations and corresponding functional components of the previously described embodiment. In an embodiment, a first negative electrode coating portion 126a is formed at a leading edge of the negative electrode coating portion 126, like in the previously described embodiment. However, a second negative electrode coating portion 126b is not formed at the leading edge, thereby forming a half-coating portion.

In an embodiment, a cover tape 426c may further be formed on a second surface of the negative electrode plate 121 at the leading edge, where the second negative electrode coating portion 126b is started. The cover tape 426c may mitigate a negative electrode mixture by wrapping the exposed leading edge of the negative electrode plate 121, which may alleviate swelling of the negative electrode plate 121, thereby suppressing deformation of the electrode assembly 420. Like in the previously described embodiment, the cover tape 426c may also be made of a general insulating material, such as PP or PET, but is not limited thereto.

While an electrode assembly and a secondary battery including the same according to the present invention have been particularly shown and described with reference to some exemplary embodiments thereof, it will be understood by those of ordinary skill in the art that various changes in form and details may be made therein without departing from the spirit and scope of the present invention as set forth in the following claims.

What is claimed is:

1. An electrode assembly comprising:
   a first electrode plate having a first electrode tab attached thereto;
   a second electrode plate having at least one second electrode tab attached thereto; and
   a separator between the first electrode plate and the second electrode plate,
   the electrode assembly wound in a state in which the first electrode plate, the separator, and the second electrode plate are stacked,
   wherein the first electrode plate comprises coating portions formed by coating an active material on first and second surfaces thereof, and a half-coating portion formed by coating the active material on only the first surface of the first and second surfaces at a region corresponding to a leading edge, on the basis of a winding direction, where an active material of the second electrode plate begins, in a cross-section along a plane that is perpendicular to a winding axis, and
   a pair of cover tapes, each covering a respective portion of the active material that forms the half-coating portion and being attached to a region of the first electrode plate which is exposed by a space provided between the pair of cover tapes, the space being centrally formed with respect to the half-coating portion.

2. The electrode assembly of claim 1, wherein the first electrode tab is positioned at a central region of the first electrode plate, and the half-coating portion is formed ahead of the first electrode tab on the basis of the winding direction.

3. The electrode assembly of claim 1, wherein the first electrode plate further comprises another half-coating portion formed by coating the active material of the first electrode plate on only the first surface of the first and second surfaces at a region corresponding to a trailing edge, on the basis of the winding direction, where the active material of the second electrode plate ends, in the cross-section along the plane that is perpendicular to the winding axis.

4. A secondary battery comprising the electrode assembly of claim 2.

5. A secondary battery comprising the electrode assembly of claim 3.

6. A secondary battery comprising the electrode assembly of claim 1.

* * * * *